Oct. 23, 1951  C. S. BRANDT ET AL  2,572,592
DRIP CHANNEL FOR VEHICLES HAVING CONVERTIBLE TOPS
Filed Sept. 29, 1948  2 SHEETS—SHEET 1
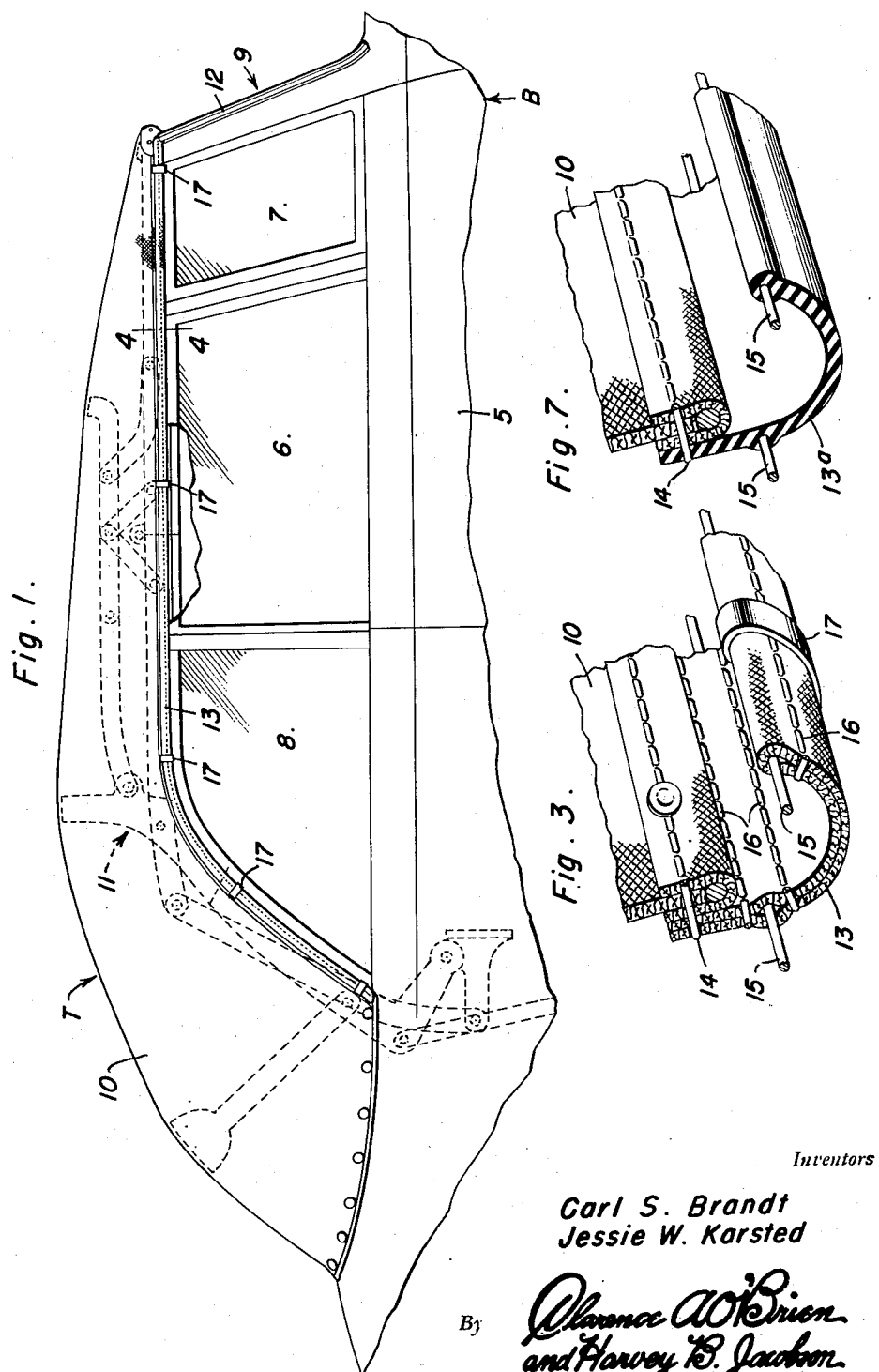
Inventors
Carl S. Brandt
Jessie W. Karsted
By Clarence A. O'Brien
and Harvey B. Jackson
Attorneys

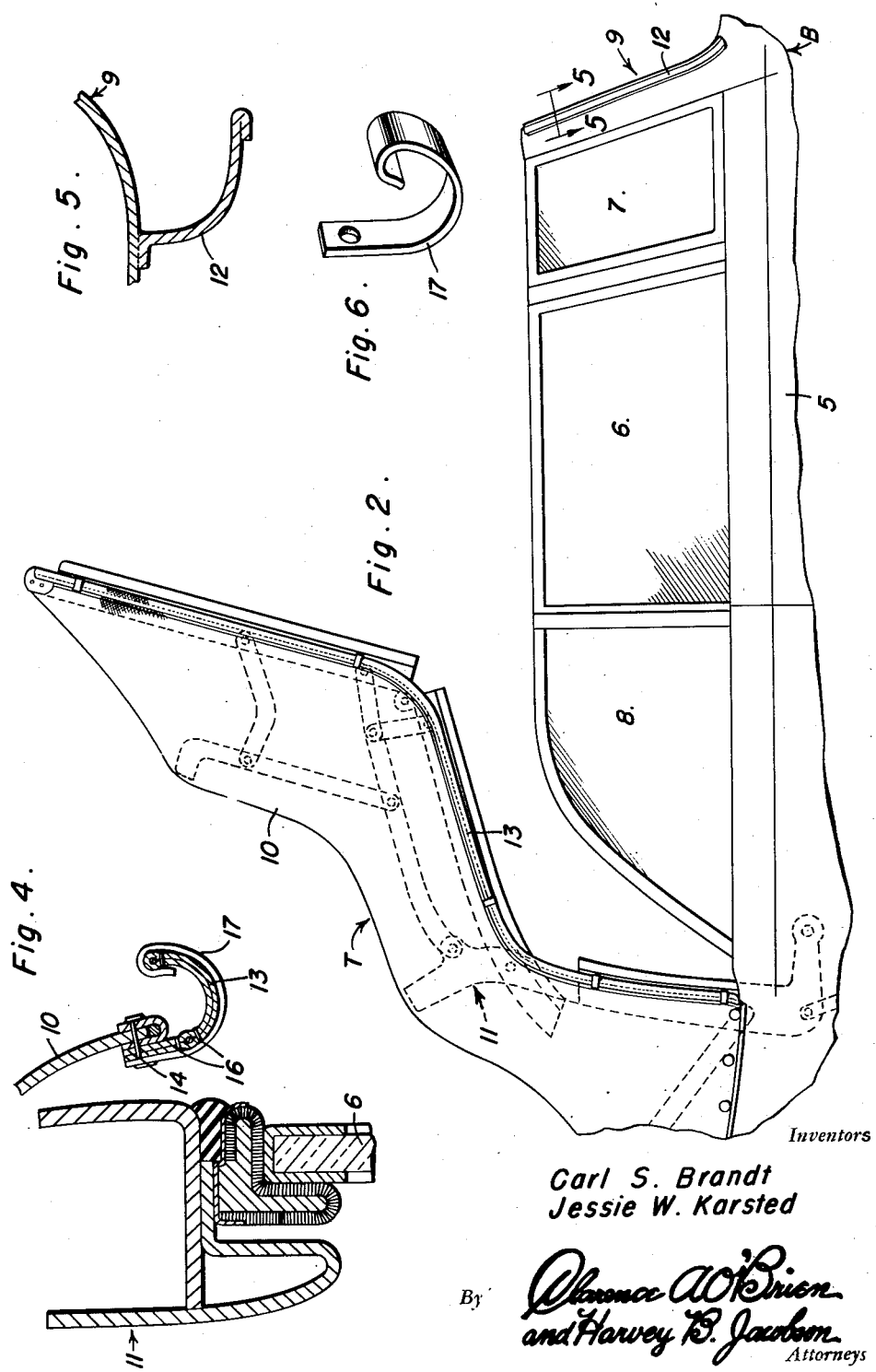

Patented Oct. 23, 1951

2,572,592

UNITED STATES PATENT OFFICE 2,572,592

DRIP CHANNEL FOR VEHICLES HAVING CONVERTIBLE TOPS

Carl S. Brandt, Ithaca, N. Y., and Jessie W. Karsted, Washington, D. C.

Application September 29, 1948, Serial No. 51,686

2 Claims. (Cl. 296—107)

This invention relates to vehicles having convertible tops, and has more particular reference to drip channels for such vehicles.

At the present time, vehicles having convertible tops are devoid of drip channels so that they drain off at the sides. As a result of this, passengers of such vehicles are subjected to considerable annoyance and discomfort in rainy weather from water pouring or driving into the vehicle body when the side transparent door and window panels are opened to any material extent for ventilation, or when a door of the vehicle is opened to permit a person to alight from or get in the vehicle. In addition, the seats of the vehicle are subjected to a considerable wetting upon leaving said panels open to any material extent or upon opening the door.

The primary object of the present invention, therefore, is to provide vehicles of the kind mentioned above with drip channels which will prevent the objectionable occurrences above mentioned, which will not interfere with collapsing of the convertible top, and which will remain in operative condition for the life of the top even though repeatedly collapsed with the latter.

The exact nature of the present invention, as well as other objects and features thereof, will become apparent from the following description when considered in connection with accompanying drawings, in which:

Figure 1 is a fragmentary side elevational view of a vehicle body having a convertible top and equipped with drip channels in accordance with the present invention, the top being raised.

Figure 2 is a view similar to Figure 1 with the top partly lowered or collapsed.

Figure 3 is an enlarged fragmentary perspective view showing a portion of the rear drip channel section and the adjacent portion of the top.

Figure 4 is an enlarged fragmentary section taken on line 4—4 of Figure 1.

Figure 5 is an enlarged fragmentary section taken on line 5—5 of Figure 2.

Figure 6 is an enlarged perspective view of one of the resilient clips for resisting transverse distortion of the flexible drip channel sections.

Figure 7 is a view similar to Figure 3, showing a modification.

Referring in detail to the drawings, an embodiment of the present invention is shown in connection with a vehicle body B having a conventional convertible or let-down vehicle top T of the outrigger type, which usually has power operated means for raising and lowering the same. The body has a door 5 at each side provided with upper transparent panels 6 and 7, and a window 8 at each side, and a fixed front windshield at 9. The top includes a top fabric 10, and collapsible supporting means 11 therefor including two series of pivotally connected links disposed at opposite sides of the vehicle body and connected by cross bows and by a header adapted to be releasably secured to the windshield. The two series of links are exact duplicates as disclosed in the U. S. patent to J. Falcon, No. 2,331,603, dated October 12, 1943, and only one of such series of links is shown by dotted lines in the drawings.

According to the illustrated embodiment of the present invention, an open-ended front drip channel section 12, preferably formed of metal and welded to the frame of the windshield as shown in Figure 5, is permanently fixed to each side of the windshield, and an open-ended rear drip channel section 13 is permanently attached to and extended along each side edge portion of the top from front to rear of the latter and over the adjacent side door and window. Each rear drip channel section is collapsible with the top and has its front end disposed to discharge water into the upper end of the front drip channel section 12 on the adjacent side of the windshield. As shown, each rear drip channel section may be flexible and continuous and suitably attached at 14 along its inner longitudinal edge portion to a free side edge portion of the top fabric 10. Such flexible channel section consists of a shaped flexible fabric member which preferably has flexible resilient filaments or spring wires 15 extended longitudinally thereof and acting to unfold said fabric member when the top is raised. As shown in Figure 3, the fabric member may be made of a strip of waterproofed textile fabric folded along its longitudinal center to provide two plies between which the wires 15 are positioned and secured in place by stitching 16. This member may be pressed to shape between heated dies, preferably after being saturated with a stiffening agent that helps the member to keep its shape without appreciably opposing flexing thereof at the points where the top folds. Means is provided to resist transverse distortion of the flexible channel section, such as spring clips 17 placed and secured thereon at suitable intervals and shaped to conform to the normal transverse shape of said channel section.

As shown in Figure 7, each flexible rear drip channel section may be a molded rubber or like member 13a attached to the top fabric 10 and having the wires 15 embedded therein. While the flexible channel section is shown with its inner edge portion lapped under the side edge portion of the top fabric, it will be evident that the inner edge portion of said channel section may be attached to the outside of the top fabric by a cemented or other leakproof joint, thus allowing placement of said channel section at a higher level or in line with the hinge points where the top folds.

From the foregoing description, it is believed that the construction, operation and advantages of the present invention will be readily understood and appreciated by those skilled in the art. Although a specific embodiment and one modification of the invention have been disclosed, it will be understood that various changes may be made without departing from the spirit of the invention as claimed.

What we claim as new is:

1. The combination of a convertible vehicle top including collapsible supporting means and top fabric covering the same and having downturned side edge portions, a drip channel of flexible material having an inner longitudinal edge portion disposed at and secured to the inner surface of a down-turned side portion of said top fabric, a flexible outer reinforcing rod embedded in the outer longitudinal edge portion of said channel, a flexible inner reinforcing rod embedded longitudinally in the inner longitudinal edge portion of the channel in a position spaced downwardly from the lower edge of the downturned portion of the top fabric, whereby portions of the channel between the inner and outer rods and above the inner rod are more flexible than the reinforced portions thereof, and a plurality of hook-shaped resilient clips disposed at longitudinally spaced points under said channel and supportably engaging the same, said clips having inner end regions secured to the inner longitudinal edge portion of the channel and to the associated downturned edge portion of the top fabric, and inturned and downturned outer end regions embracing the outer longitudinal edge portion of the channel, whereby to resist transverse distortion of the latter.

2. As an article of manufacture, a drip channel structure for convertible vehicle tops, said structure comprising a drip channel of flexible material having an inner longitudinal edge portion adapted to be secured to a side of a vehicle top fabric, a flexible outer reinforcing rod embedded in the outer longitudinal edge portion of said channel, a flexible inner reinforcing rod embedded in the inner longitudinal edge portion of the channel in a position spaced downwardly from its upper edge, whereby portions of the channel between the inner and outer rods and above the inner rod are more flexible than the reinforced portions thereof, and a plurality of hook-shaped resilient clips adapted to be placed at longitudinally spaced points under said channel for supportably engaging the same, said clips having inner regions adapted for securing to the inner longitudinal edge portion of the channel and inturned and downturned outer regions adapted to embrace the outer longitudinal edge portion of the channel, whereby to resist transverse distortion of the latter.

CARL S. BRANDT.
JESSIE W. KARSTED.

REFERENCES CITED

The following references are of record in the file of this patent:

UNITED STATES PATENTS

| Number | Name | Date |
|---|---|---|
| Re. 19,476 | Carr | Oct. 13, 1931 |
| 1,328,383 | Ludlow | Jan. 20, 1920 |
| 1,826,922 | Carr | Oct. 13, 1931 |
| 2,015,547 | Carr | Sept. 24, 1935 |
| 2,319,723 | Crowe et al. | May 18, 1943 |

FOREIGN PATENTS

| Number | Country | Date |
|---|---|---|
| 108,418 | Great Britain | Aug. 9, 1917 |